US 6,564,660 B2

(12) United States Patent
Kawamura et al.

(10) Patent No.: US 6,564,660 B2
(45) Date of Patent: May 20, 2003

(54) BALL SCREW FEED MECHANISM

(75) Inventors: Yoshinori Kawamura, Kanagawa (JP);
Yoshihiro Koyanagi, Kanagawa (JP);
Mamoru Murata, Saitama (JP);
Mitsuyoshi Nishimura, Saitama (JP)

(73) Assignees: Fuji Photo Film CO, Ltd., Kanagawa (JP); Fuji Photo Optical Co. Ltd., Saitama (JP)

( * ) Notice: Subject to any disclaimer, the term of this patent is extended or adjusted under 35 U.S.C. 154(b) by 0 days.

(21) Appl. No.: 09/799,559

(22) Filed: Mar. 7, 2001

(65) Prior Publication Data

US 2003/0019314 A1 Jan. 30, 2003

(30) Foreign Application Priority Data

Mar. 7, 2000 (JP) ........................................ 2000-062665

(51) Int. Cl.[7] ................................................ F16H 1/26
(52) U.S. Cl. .................. 74/89.36; 74/89.42; 74/424.71; 384/535
(58) Field of Search .................... 74/424.71–424.96, 74/89.23, 89.36, 89.39, 89.42; 384/215, 218, 220, 223, 225, 535, 536, 581, 582

(56) References Cited

U.S. PATENT DOCUMENTS

| 331,311 A | * | 12/1885 | Marquardt | .................... 384/218 |
| 1,879,357 A | * | 9/1932 | Lindstrom | ................... 384/581 |
| 3,728,903 A | * | 4/1973 | Haller | ........................ 74/89.15 |
| 3,792,619 A | * | 2/1974 | Cannon et al. | ............. 74/89.15 |
| 3,959,898 A | * | 6/1976 | McWatters | ...................... 37/72 |
| 4,802,558 A |  | 2/1989 | Garnett | ....................... 188/134 |
| 5,140,863 A | * | 8/1992 | Niino et al. | ................ 74/89.15 |
| 5,482,416 A |  | 1/1996 | Reko | ........................... 409/238 |
| 5,613,400 A |  | 3/1997 | Sato et al. | .................. 74/89.15 |
| 5,761,960 A |  | 6/1998 | Nagai et al. | ............... 74/89.15 |
| 5,918,506 A | * | 7/1999 | Rantanen | ................ 74/424.8 A |

FOREIGN PATENT DOCUMENTS

| EP | 0 601 185 A1 |  | 6/1994 | ........... F16H/25/20 |
| GB | 2 102 512 A | * | 6/1981 | ........... F16C/27/00 |
| JP | 3-103614 | * | 4/1991 | ........... F16C/17/02 |

* cited by examiner

Primary Examiner—Thomas R. Hannon
Assistant Examiner—Timothy McAnulty
(74) Attorney, Agent, or Firm—Sughrue Mion, PLLC

(57) ABSTRACT

A casing of a ball bearing which holds a ball screw can be displaced on a supporting stand against urging force of a compression coil spring and a tensile coil spring. If vibration of the ball screw is transmitted to the casing, the casing attempts to move on the supporting stand. However, when, due to the vibration, the casing is displaced against the urging force of the compression coil spring and the tensile coil spring, the urging force forcibly attempts to return the casing to its original position. A frequency of vibration of the casing is thereby forcibly changed.

19 Claims, 13 Drawing Sheets

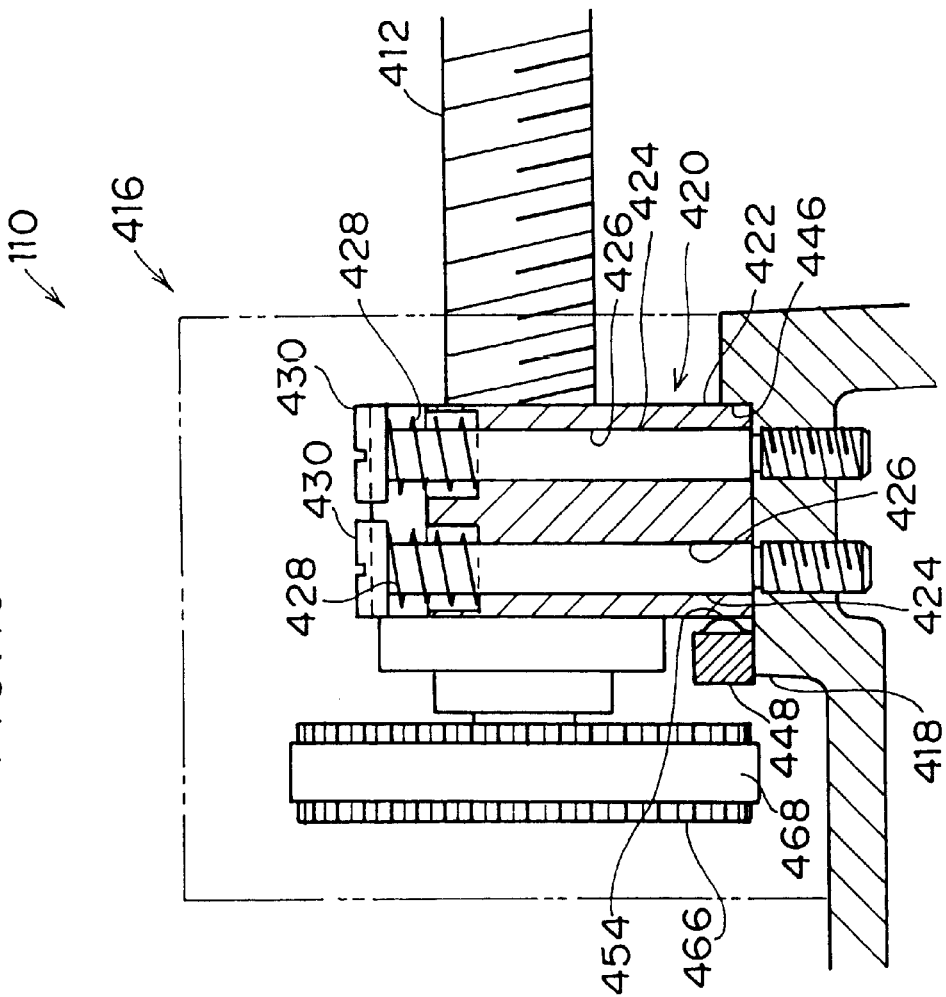

BALL SCREW FEED MECHANISM

BACKGROUND OF THE INVENTION

1. Field of the Invention

The present invention relates to a ball screw feed mechanism in which, by rotating a ball screw around the axis thereof, a slider, which is screwed with the ball screw, is made to slide in the axial direction of the ball screw.

2. Description of the Related Art

Technology (a printing plate automatic exposure device) has been developed in which, by using a printing plate (hereinafter "photopolymer plate") in which a photosensitive layer (e.g., a photopolymerizable layer) is provided on a support, an image is recorded by a direct laser beam or the like onto the photopolymerizable layer of the photopolymer plate.

In such a technology, photopolymer plates are taken out one-by-one from a magazine which accommodates a plurality of photopolymer plates, and the photopolymer plates are supplied to an exposure section where the aforementioned recording is carried out. Directly before the exposure section, the photopolymer plate is placed on a basically smooth and flat surface plate and is positioned on the surface plate. Thereafter, the photopolymer plate is fed out together with the surface plate to the exposure section.

An example of the driving mechanism for moving the surface plate is a driving mechanism including a ball screw whose axial direction is along the moving direction of the surface plate and which rotates around its own axis due to driving force of a motor; a slider which is integrally connected to the surface plate and which is screwed together with the ball screw; and a guide rod which is disposed parallel to the ball screw, passes through the slider, and guides the slider in the axial direction of the ball screw. In this driving mechanism, by rotating the ball screw, the slider is slid while being guided by the guide rod, and the surface plate slides together with the slider. Further, in the exposure section, exposure is carried out basically in accordance with the amount of rotation of the ball screw.

However, by operating the motor which rotates the ball screw, the motor itself vibrates. This vibration may be transferred to the ball screw, such that the ball screw vibrates. Here, if the vibration frequency of the motor coincides with the resonance frequency of the ball screw or the bearings and the like supporting the ball screw, the vibration of the ball screw, and thus the vibration of the surface plate, becomes large, such that irregularities arise in the image formed on the photopolymer plate.

SUMMARY OF THE INVENTION

In view of the aforementioned, an object of the present invention is to provide a ball screw feed mechanism in which vibration of a ball screw is reduced.

A first aspect of the ball screw feed mechanism of the present invention includes: a ball screw which is rod-shaped, and at whose outer peripheral portion a male screw is formed, and which rotates around a shaft of the ball screw due to driving force of a driving device; a slider which is screwed together with the ball screw, and which slides along an axial direction of the ball screw due to rotation of the ball screw around the axis of the ball screw; a supporting portion which supports the ball screw at an axial direction end portion of the ball screw such that the ball screw is displaceable along the axial direction of the ball screw; and an urging device which urges the ball screw in a direction opposite to a displacement direction, with respect to displacement of the ball screw along the axial direction of the ball screw.

In the ball screw feed mechanism of the above-described structure, the ball screw receives driving force of the driving device and rotates, and the slider is thereby slid along the axial direction of the ball screw. When various types of vibration, such as vibration of the driving device caused by its own driving force, are generated, the vibration may be transmitted to the ball screw such that the ball screw vibrates in its own axial direction. Here, even in a case in which the resonance frequency of the ball screw itself coincides with the frequency of the aforementioned vibration due to the material, the configuration or the like of the ball screw, in the present ball screw feed mechanism, when the ball screw is displaced in accordance with the vibration along the axial direction, the urging device urges the ball screw in the direction opposite to this displacement in an attempt to forcibly return the ball screw to its original position. In this way, the resonance point is forcibly shifted. The vibration of the ball screw is thereby mitigated, and accordingly, the vibration of the slider is reduced.

A second aspect of the present invention is a ball screw feed mechanism including: a ball screw which is rod-shaped, and at whose outer peripheral portion a male screw is formed, and which rotates around a shaft of the ball screw due to driving force of a driving device; a slider which is screwed together with the ball screw, and which slides along an axial direction of the ball screw due to rotation of the ball screw around the axis of the ball screw; a supporting portion which supports the ball screw at an axial direction end portion of the ball screw such that the ball screw is displaceable along a direction orthogonal to the axial direction of the ball screw; and an urging device which urges the ball screw in a direction opposite to a displacement direction, with respect to displacement of the ball screw along the direction orthogonal to the axial direction of the ball screw.

In the ball screw feed mechanism of the above-described structure, the ball screw receives driving force of the driving device and rotates, and the slider is thereby slid along the axial direction of the ball screw. When various types of vibration, such as vibration of the driving device caused by its own driving force, are generated, the vibration may be transmitted to the ball screw such that the ball screw vibrates in a direction orthogonal to its own axial direction (i.e., in the rotary radial direction of the ball screw). Here, even in a case in which the resonance frequency of the ball screw itself coincides with the frequency of the aforementioned vibration due to the material, the configuration or the like of the ball screw, in the present ball screw feed mechanism, when the ball screw is displaced in accordance with the vibration along the direction orthogonal to the axial direction, the urging device urges the ball screw in the direction opposite to this displacement in an attempt to forcibly return the ball screw to its original position. In this way, the resonance point is forcibly shifted. The vibration of the ball screw is thereby mitigated, and accordingly, the vibration of the slider is reduced.

A third aspect of the present invention is a method for reducing vibration in a ball screw feed mechanism, wherein the ball screw feed mechanism includes a slider threadably disposed on a rod, with the slider moving along the rod when the rod rotates, the method comprising: (a) extending one end of the rod through a bearing; (b) applying urging forces along three different directions to the bearing, with each direction being substantially orthogonal to each of the other directions, for resisting displacements of the rod; and (c) rotatably driving the rod using a motor to apply rotational mechanical energy to the end of the rod extending through the bearing.

BRIEF DESCRIPTION OF THE DRAWINGS

FIGS. 9A, 9B and 9C are side views respectively illustrating operation of a discharge mechanism section, wherein FIG. 9A illustrates a horizontal position state of a temporarily supporting arm, FIG. 9B illustrates a retracted position state of the temporarily supporting arm, and FIG. 9C illustrates a pushed-up position state of the temporarily supporting arm.

FIG. 10 is a side view in which a vicinity of another axial direction end portion of a ball screw is illustrated in an enlarged manner.

DESCRIPTION OF THE PREFERRED EMBODIMENTS

Hereinafter, an automatic exposure device 100 for photopolymer plates 102, in which a ball screw feed mechanism relating to an embodiment of the present invention is applied to an exposure conveying section 110, will be described. First of all, the structure of the entire device will be described, and then the main portions of the present embodiment will be described.

Overall Structure of Automatic Exposure Device 100

Figure 1:
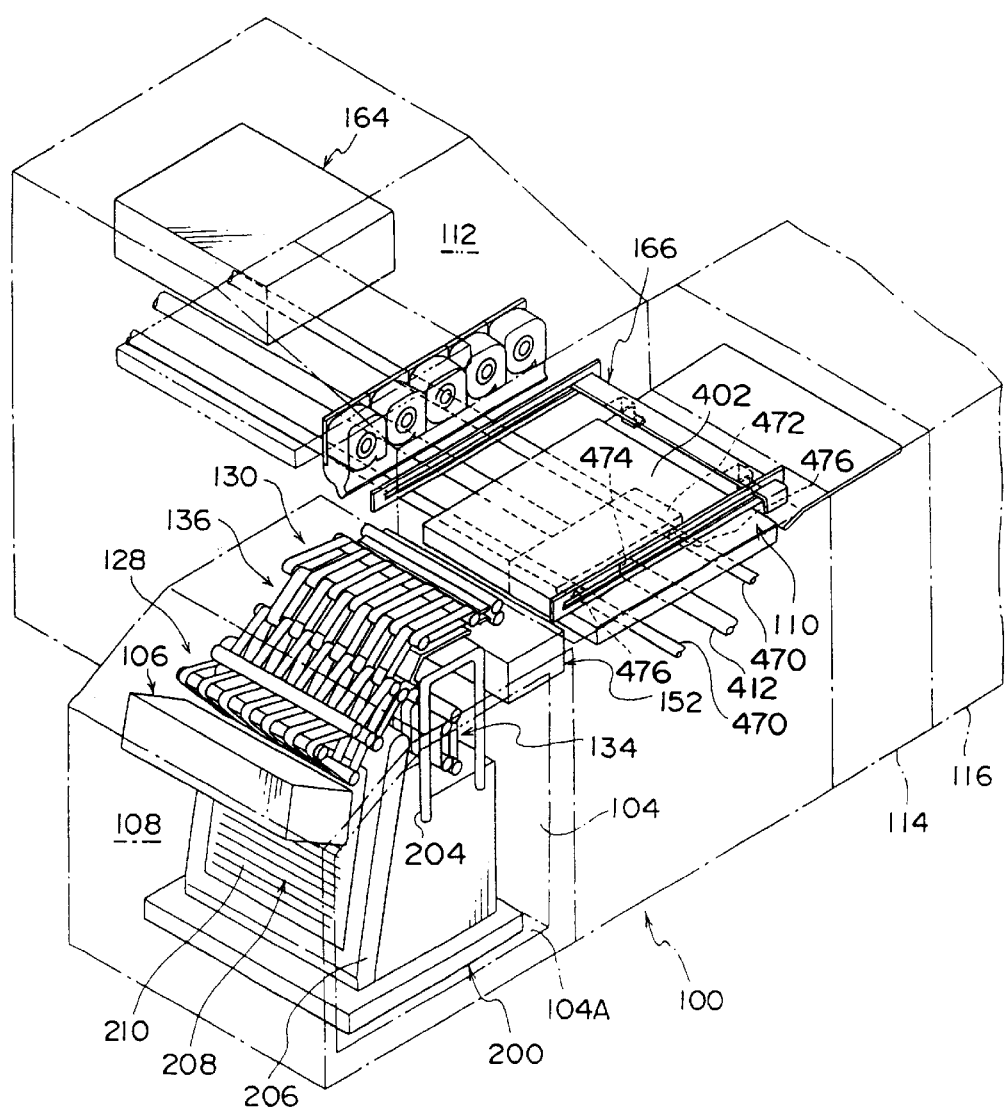
FIG. 1 is a perspective view illustrating an overall structure of an automatic exposure device to which an embodiment of the present invention is applied.

FIG. 1 is a perspective view of the overall structure of the automatic exposure device 100 for photopolymer plates relating to the present embodiment. As illustrated in FIG. 1, the automatic developing device 100 is basically formed by a plate supplying section 108 which supplies photopolymer plates 102 (see FIG. 2); an exposure section 112 which records an image onto the photopolymer plate 102; an exposure conveying section 110 which serves as a printing plate conveying device which supplies, to the exposure section 112, the photopolymer plate 102 which has been fed in from the plate supplying section 108; and a discharge mechanism portion 166 which discharges a photopolymer plate 102 after an image has been recorded thereon by the exposure section 112. These sections will basically be explained in that order hereinafter.

Plate Supplying Section 108

An automatic developing device 116 can be connected, via a buffer portion 114, to the downstream side of the automatic exposure device 100 which is structured as described above, such that plate supplying, exposure and development can all be carried out automatically.

Figure 3:
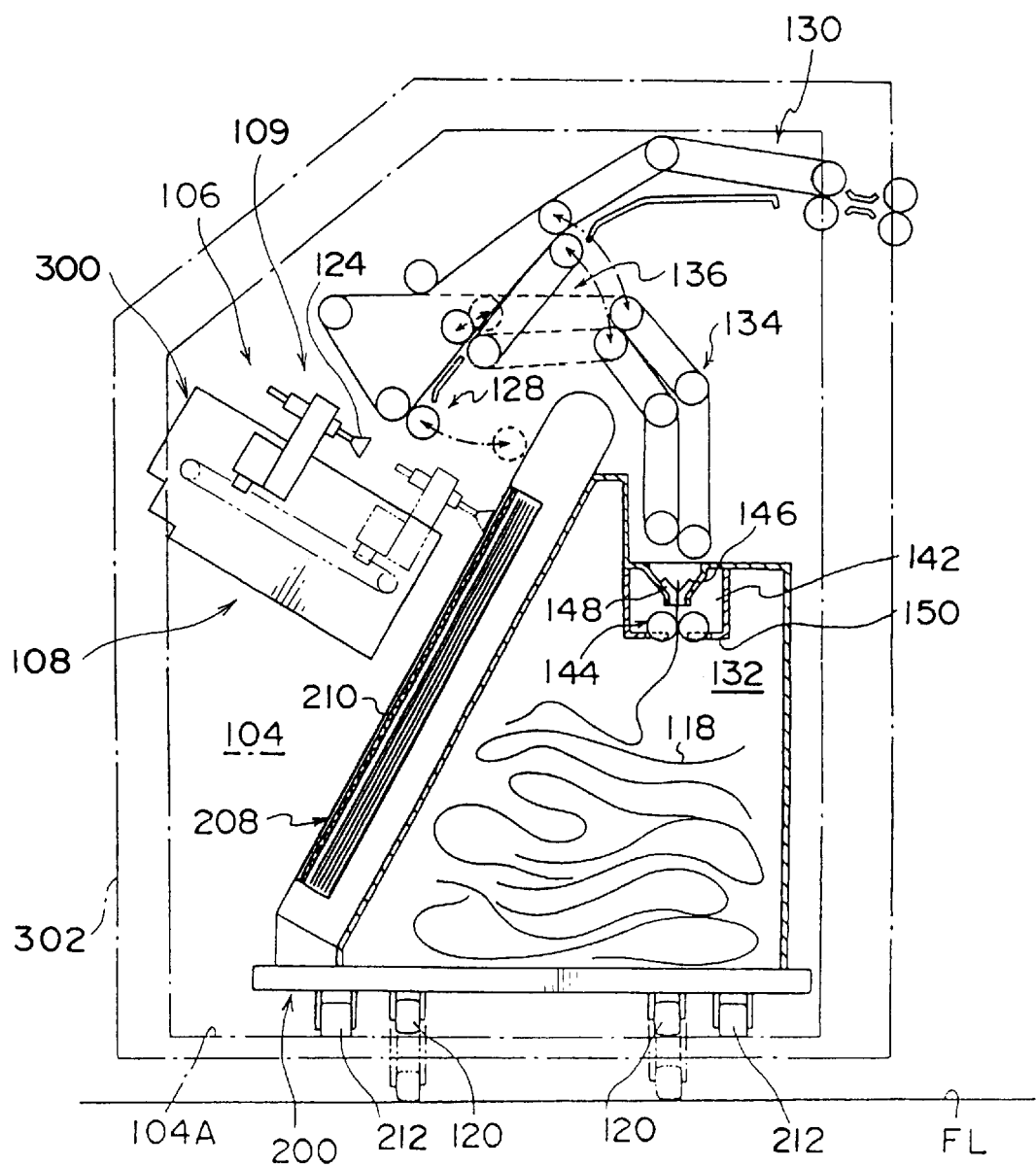
FIG. 3 is a side view of a plate feeding section.

As illustrated in FIGS. 1 and 3, the plate supplying section 108 which supplies the photopolymer plates 102 is basically structured by a plate accommodating section 104 which accommodates a stand 200 at which the photopolymer plates 102 are loaded; a sheet section 106 which lifts out the photopolymer plates 102 accommodated in the plate accommodating section 104; a common conveying section 128 which receives and conveys the photopolymer plates 102 and interleaf sheets 118 from the sheet section 106; a photopolymer plate conveying section 130 which receives photopolymer plates 102 from the common conveying section 128 and feeds the photopolymer plates 102 out to the exposure conveying section 110; an interleaf sheet conveying section 134 which receives the interleaf sheets 118 from the common conveying section 128 and feeds the interleaf sheets 118 out to an interleaf sheet accommodating section 132 (provided at the stand 200); and a switching conveying section 136 for switching operation such that conveying takes place from the common conveying section 128 to either of the photopolymer plate conveying section 130 or the interleaf sheet conveying section 134.

Plate Accommodating Section 104

Figure 2:
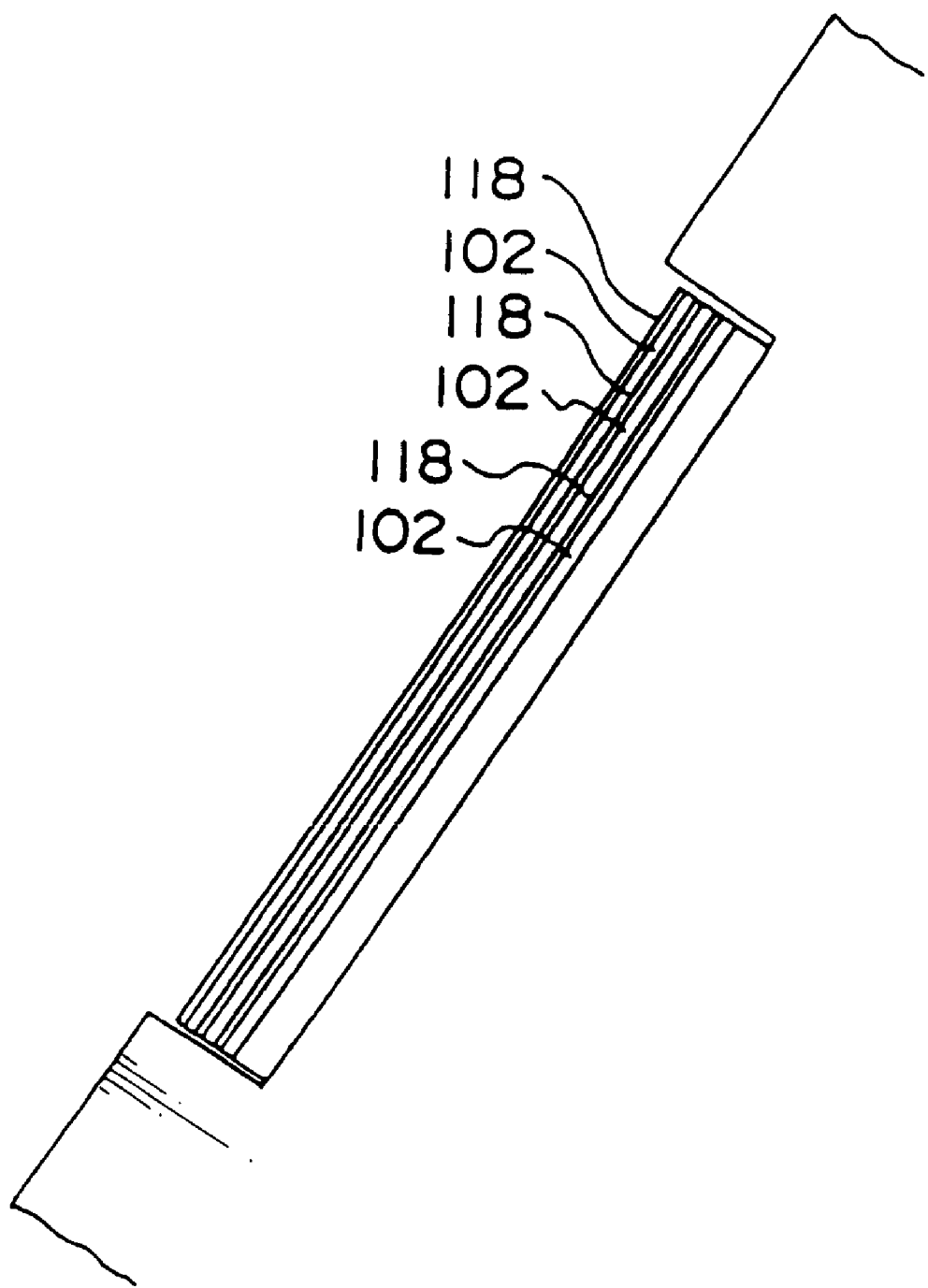
FIG. 2 is a side view illustrating a state in which photopolymer plates and interleaf sheets are stacked in a magazine.

As illustrated in FIG. 3, the stand 200, to which a handle 204 is mounted, is accommodated in the plate accommodating section 104 of the plate supplying section 108. A stacking section 206, which is formed in a substantially right triangular configuration as seen in side view, is provided at a load-carrying platform 202 of the stand 200. A magazine 208, in which plural photopolymer plates 102 can be accommodated in a stacked state, stands at the inclined surface portion of the stacking section 206. As illustrated in FIG. 2, the interleaf sheet 118, which functions as a sheet material for protecting the surface of the photopolymer plate 102, is laminated on the surface of the photopolymer plate 102, such that one interleaf sheet 118 is laminated on each photopolymer plate 102. As a result, the photopolymer plates 102 and the interleaf sheets 118 are stacked alternately.

A shutter 210 is provided at the magazine 208. By shutting the shutter 210 when the automatic exposure device 100 is in a place other than a dark room, the photopolymer plates 102 can be prevented from being exposed. In actuality, the stand 200 is transported between the plate accommodating section 104 and a darkroom in which the photopolymer plates 102 are stored. Thus, exposure of the photopolymer plates 102 during this transportation is prevented by the shutter 210.

Although not shown in the drawings, a pair of guide plates for restricting the transverse direction end portions of the accommodated photopolymer plates 102 and interleaf sheets 118 are provided at the magazine 208. Handling plates, which correspond to the leading end corner portions of the accommodated photopolymer plates 102 and interleaf sheets 118, are provided at the leading end portions of the respective guide plates. When a photopolymer plate 102 is removed from the magazine 208 by a sucker unit 304 which will be described later, the handling plates engage with the photopolymer plate 102 and function to prevent the leading end corner portions thereof from bending and peeling.

A pair of interleaf sheet presser plates (not shown) are provided at the transverse direction intermediate portion of the magazine 208. The interleaf sheet presser plates are provided in correspondence with the interleaf sheet 118 at the surface of the photopolymer plate 102 accommodated in the magazine 208. When the photopolymer plate 102 is removed from the magazine 208 by the sucker unit 304 which will be described in detail later, the interleaf sheet presser plates engage with the interleaf sheet 118 and function to hold the interleaf sheet 118.

As illustrated in FIG. 3, a floor portion 104A is formed, at a position higher than the floor surface FL, at the plate accommodating section 104 which is accommodated at the stand 200 provided at the magazine 208. Thus, the stand 200 is structured so as to be raised up onto the floor portion 104A from the floor surface FL. Namely, the stand 200 is supported on the floor surface FL via casters 120. The casters 120 are movable, with respect to the stand 200, between a projected position (the position illustrated by the imaginary lines in FIG. 3) and an accommodated position (the position illustrated by the solid lines in FIG. 3). Further, in accordance with the work for accommodating the stand 200 into the plate accommodating section 104, when the casters 120 are folded up and moved to their accommodated positions, simultaneously, auxiliary rollers 212 correspond to the floor portion 104A, and thereafter, the stand 200 is supported on the floor portion 104A via the auxiliary rollers 212.

Sheet Section 106

The sheet section 106 is provided above the plate accommodating section 104. The sheet section 106 includes a suction cup 124 which approaches or moves away from the surface of the interleaf sheet 118 or the photopolymer plate 102 accommodated in a stacked state in the magazine 208. The photopolymer plates 102 and interleaf sheets 118 accommodated in a stacked state in the magazine 208 are sucked by the suction cup 124 and are alternately removed, and are fed out to the common conveying section 128. In addition to the suction cup 124, the sheet section 106 is also provided with a fan (not shown). When the interleaf sheet 118 is sucked by the suction cup 124, the suction fan is positioned at a position which is slightly separated from the interleaf sheet 118 (or the suction fan may contact the interleaf sheet 118). By operating only the suction fan, only the interleaf sheet 118, which is lightweight and thin, is sucked up. Thereafter, by sucking by using the suction cup 124, at the time the interleaf sheet 118 is sucked, sucking of the photopolymer plate 102 therebeneath can be prevented.

Common Conveying Section 128, Photopolymer Plate Conveying Section 130, Switching Section 136

As illustrated in FIG. 1, after the photopolymer plate 102 or the interleaf sheet 118, which has been conveyed in from the sheet section 106, is conveyed by the common conveying section 128, the conveying direction is selectively switched by the switching conveying section 136, such that the photopolymer plate 102 is fed out onto the surface plate 402 by the photopolymer plate conveying section 130 and the interleaf sheet 118 is fed, by the interleaf sheet conveying section 134, into the interleaf sheet accommodating section 132 provided within the stand 200. Namely, because the photopolymer plate 102 and the interleaf sheet 118 are stacked alternately, each time sucking is carried out at the sheet section 106, the switching conveying section 136 is switched such that the photopolymer plates 102 and the interleaf sheets 118 are respectively conveyed in predetermined directions. The common conveying section 128, the photopolymer plate conveying section 130, and the switching conveying section 136 have many common structural portions, and will therefore be described together.

Figure 4A:
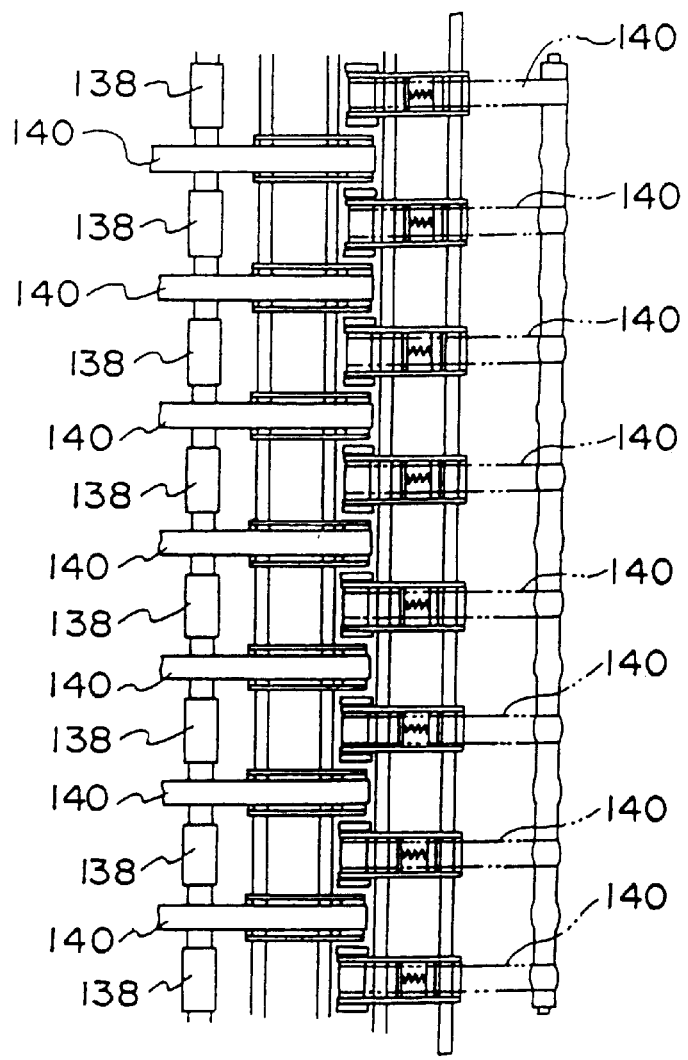
FIGS. 4A, 4B and 4C are plan views respectively illustrating one portion of a conveying system of the plate feeding section.
Figure 4B:
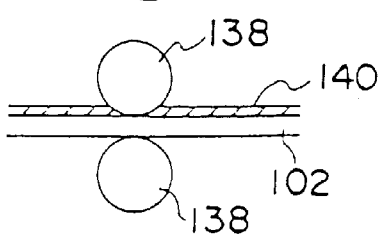
Figure 4C:
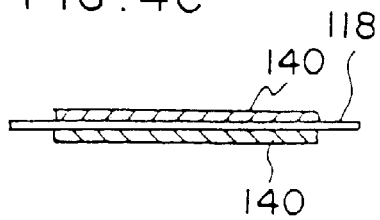

As illustrated in FIG. 1 and FIG. 4A, each of the common conveying section 128 and the switching conveying section 136 is a conveying system in which skewer rollers 138 and thin belts 140 are combined, and the main function thereof is to convey the photopolymer plates 102 (see FIG. 4B). Namely, the photopolymer plates 102 are conveyed while being nipped by the strong nipping force of the skewer rollers 138. The thin belts 140 function as guide plates which move synchronously with the conveying In contrast, as illustrated in FIG. 1 and FIG. 4C, the interleaf sheet conveying section 134 is a conveying system formed only by the thin belts 140. The interleaf sheets 118 are conveyed while being nipped by the weak nipping force of the thin belts 140.

Figure 5:
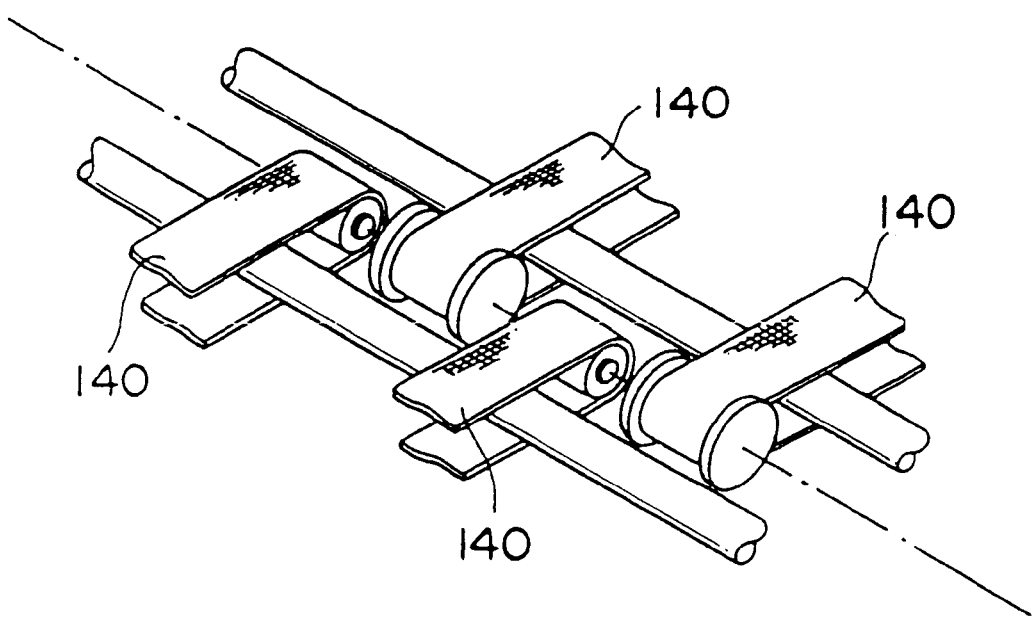
FIG. 5 is a perspective view illustrating a transfer section of a different conveying system of the plate feeding section.

As illustrated in FIG. 5, at the transfer ("hand-over") portion of each conveying section, the respective distal end portions project out alternately in skewer shapes, such that the distal end of one concave portion or one convex portion opposes the distal end of a convex portion or a concave portion. (In other words, a coaxial, common conveying path is formed.) In this way, when the photopolymer plate 102 or the interleaf sheet 118 is transferred, the problem of the photopolymer plate 102 or the interleaf sheet 118 becoming wound up by the skewer rollers 138 or the thin belts 140 can be prevented in advance.

Interleaf Sheet Conveying Section 134

As illustrated in FIG. 3, the interleaf sheet accommodating section 132 is provided within the stand 200. The interleaf sheet accommodating section 132 accommodates the interleaf sheets 118 which are conveyed by the interleaf sheet conveying section 134 which will be described hereinafter. A sheet material forcibly stacking device 141 is provided at the upper end portion of the interleaf sheet accommodating section 132 in the stand 200. The sheet material forcibly stacking device 141 forcibly stacks, in the interleaf sheet accommodating section 132, the interleaf sheets 118 which are conveyed by the interleaf sheet conveying section 134.

Figure 6:
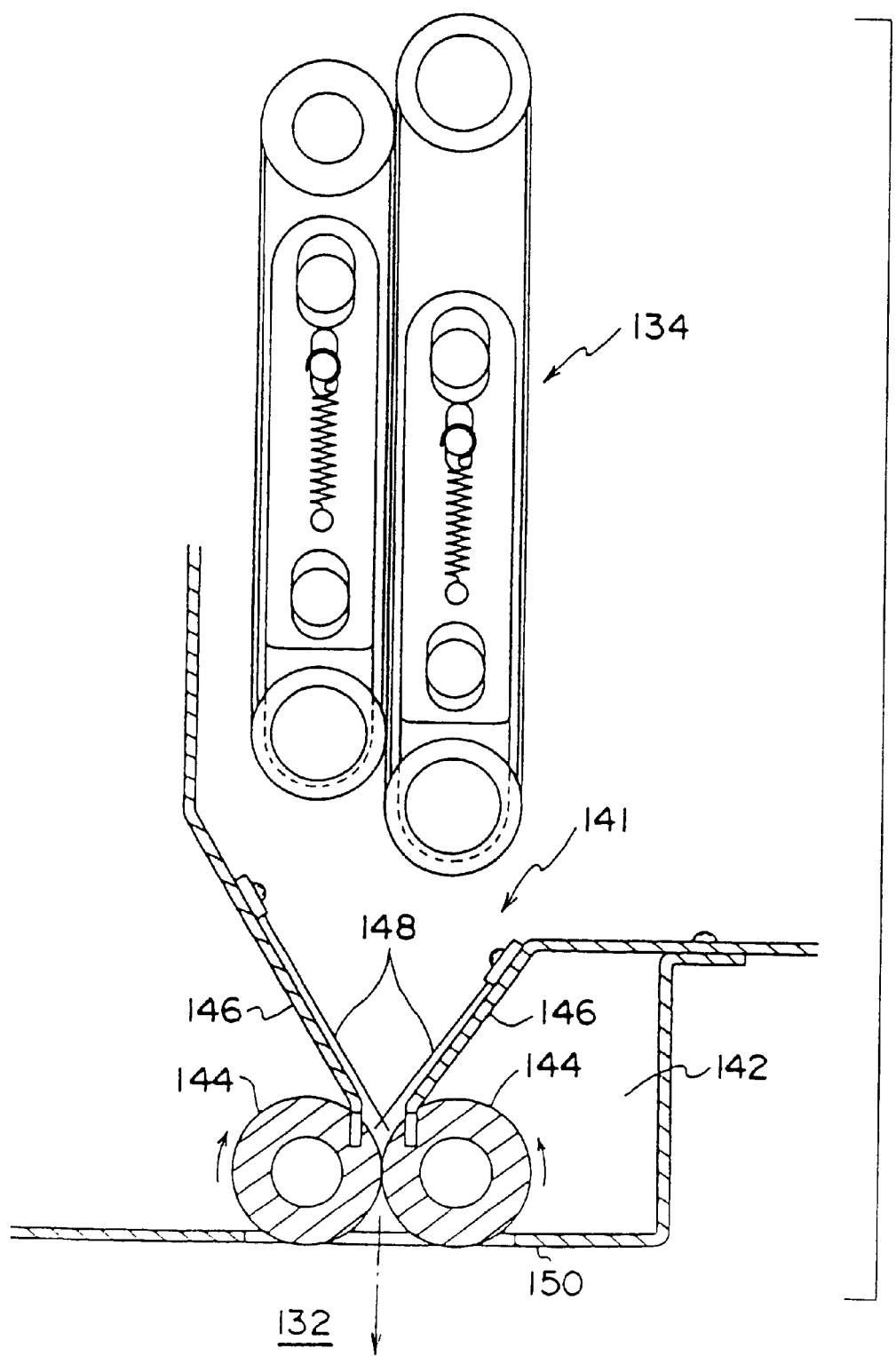
FIG. 6 is a cross-sectional view illustrating details of a sheet material forcibly stacking device.
Figure 7:
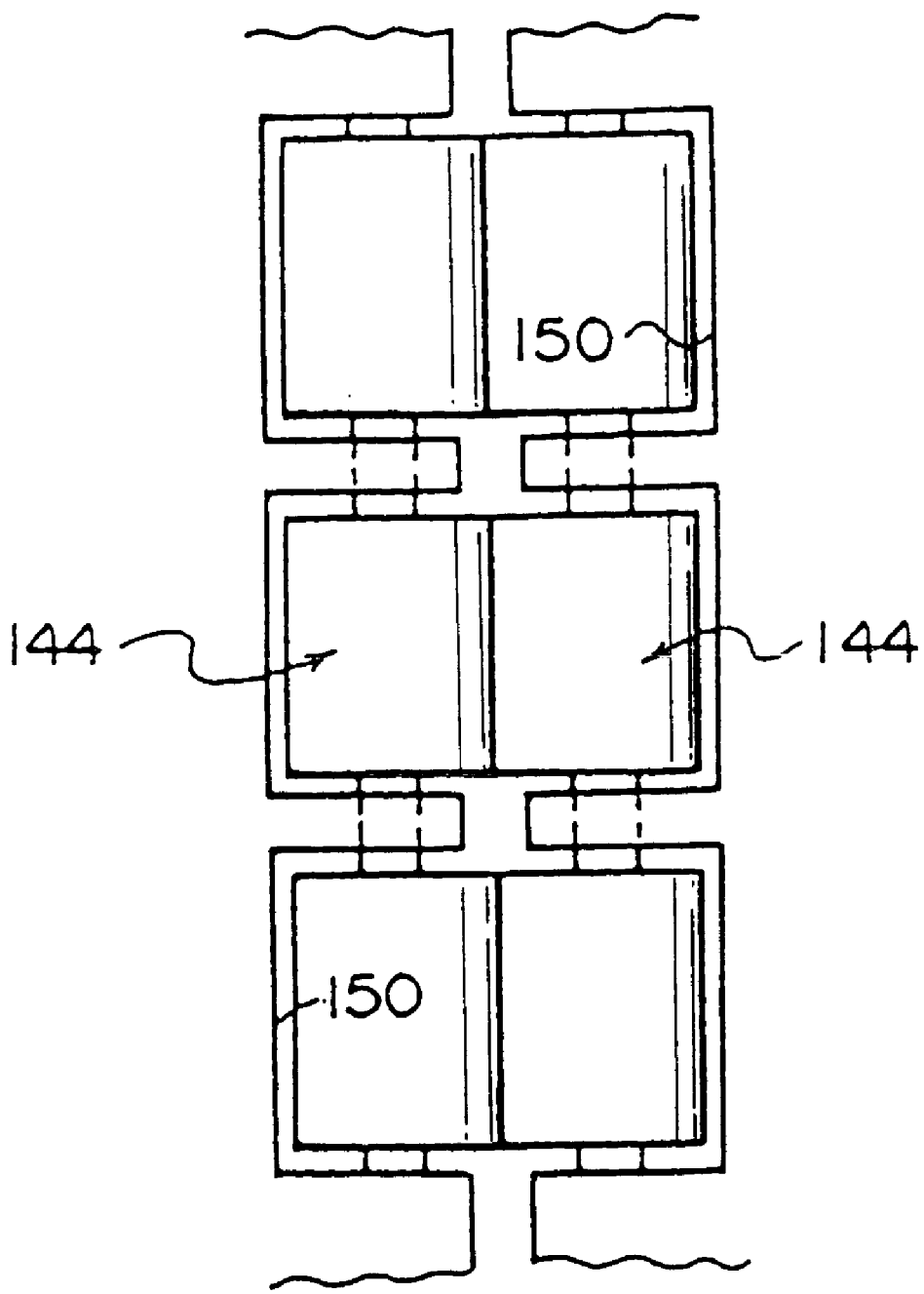
FIG. 7 is a plan view illustrating a roller and a take-up preventing plate of the sheet material forcibly stacking device.

The detailed structure of the sheet material forcibly stacking device 141 is illustrated in FIG. 6. As illustrated in this figure, in the sheet material forcibly stacking device 141, a pair of rollers 144, which serve as gripping infeed rollers, are provided at an insertion opening 142 of the interleaf sheets 118 which is provided at the upper end portion of the interleaf sheet accommodating section 132. As illustrated in FIG. 7, the pair of rollers 144 are skewer-type rollers, and are driven to rotate at a linear speed which is slightly faster (about 1.1 times faster) than the conveying speed of the interleaf sheet conveying section 134. Thus, when the interleaf sheet 118 spans between the interleaf sheet conveying section 134 and the rollers 144, the interleaf sheet 118 is conveyed while being maintained in a predetermined tense state. Jamming due to the interleaf sheet 118 going slack or the like can be prevented.

With reference to FIG. 6, taper shaped guide plates 146, whose widths (in the direction of thickness of the interleaf sheet 118) gradually become more narrow, are provided at the front side of the insertion opening 142. A charge removing brush 148 is mounted to each of the guide plates 146 which are formed in taper shapes and oppose one another. The charge removing brushes 148 remove the electrical charges of the interleaf sheet 118 inserted in the insertion opening 142.

A wind-up preventing plate 150 is provided in a vicinity of the bottom portions of the pair of rollers 144, so as to follow along the convexities and concavities formed by the skewer shapes of the rollers 144. In this way, even if a portion of the interleaf sheet 118, which has passed through the rollers 144 and has been stacked in the interleaf sheet accommodating section 132, contacts the rollers 144, the wind-up preventing plate 150 can prevent the winding-up thereof.

Exposure Conveying Section 110

As illustrated in FIG. 1, the exposure conveying section 110 is provided with the surface plate 402. The photopolymer plate 102, which has been conveyed by the photopolymer plate conveying section 130 and has separated from the photopolymer plate conveying section 130 in a horizontal state, is transferred and loaded onto the top surface of the surface plate 402.

Figure 8A:
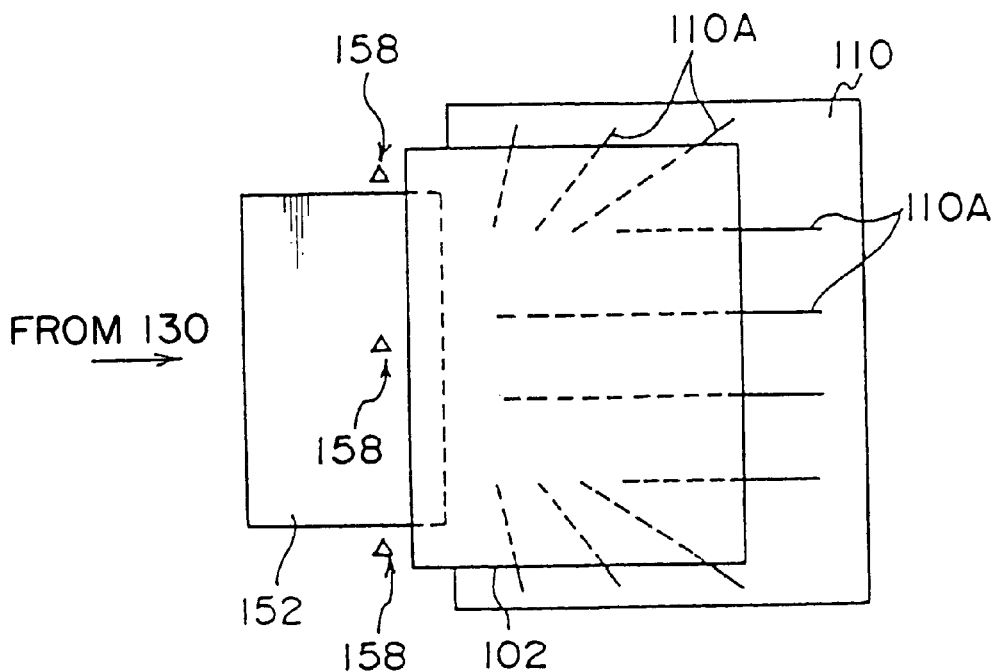
FIG. 8A is a plan view of a surface plate.
Figure 8B:
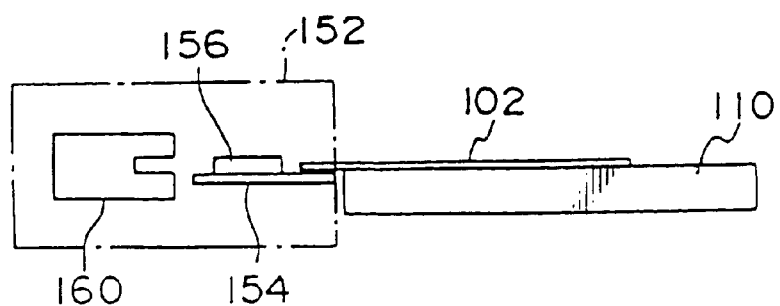
FIG. 8B is a side view of the surface plate.

The height of the top surface of the surface plate 402 is set to be a position which is lower than the horizontal conveying height of the photopolymer plate conveying section 130. Further, a slight gap in the conveying direction is provided therebetween. As a result, when the photopolymer plate 102 is discharged from the photopolymer plate conveying section 130, the photopolymer plate 102 lands on the surface plate 402 in a state in which it is slightly hanging down, and the conveying direction trailing end portion thereof is positioned further toward the front side than the surface plate 402. As illustrated in FIG. 8, a temporarily supporting arm 154, which is provided at a discharge mechanism section 166 which will be described later, is provided at the front side thereof, and prevents the photopolymer plate 102 from hanging down.

A moving body 152, which can move in directions of approaching and moving apart from the surface plate 402, is provided in a vicinity of the temporarily supporting arm 154. A pusher plate 156, which pushes, in the conveying direction, the trailing end portion of the photopolymer plate 102, is provided at the moving body 152. Due to the trailing end portion of the photopolymer plate 102 being pushed by the pusher plate 156, the photopolymer plate 102 can be prevented from being conveyed at an angle with respect to the conveying direction, and can be fed out to a predetermined conveying direction reference position. This reference position is a position at which the conveying direction trailing end portion of the photopolymer plate 102 juts out slightly from the surface plate 402.

At this reference position, sensors 158 are provided at a plurality of positions including the both conveying direction trailing end portion corner portions of the photopolymer plate 102. Due to the conveying direction trailing end portion of the photopolymer plate 102 being detected by the sensors 158, the pushing by the pusher plate 156 is stopped. Further, the sensors 158 are also applied to the detection of the transverse direction position of the photopolymer plate 102. Namely, due to the surface plate 402 moving in the transverse direction, the corner portions of the photopolymer plate 102 and the sensors 158 coincide, and this position is registered as the initial position of the photopolymer plate 102.

A relative position between the position of the photopolymer plate 102 which has been moved to the initial position and the scanning exposure start position at the exposure section 112 which will be described later is determined, and in this state, suction and holding by suction grooves 110A provided at the surface plate 402 is carried out. Punch holes are formed by a puncher 160 provided at the moving body 152, in the photopolymer plate 102 which is sucked and held.

A ball screw 412 is provided beneath the surface plate 402. As illustrated in FIG. 1, the longitudinal direction (axial direction) of the ball screw 412 is the direction from the initial position of the surface plate 402 (i.e., the position at which the photopolymer plate 102 which has moved away from the photopolymer plate conveying section 130 is transferred) toward the exposure section 112 which will be described later. A supporting stand (not shown) is provided at one longitudinal direction end side of the ball screw 412, and shaft-supports the one longitudinal direction end side of the ball screw 412 such that it is freely rotatable around the longitudinal direction of the ball screw 412.

As illustrated in FIG. 10, which is an enlarged side view of the other longitudinal direction end portion of the ball screw 412, a supporting section 416 is provided at this other longitudinal direction end portion of the ball screw 412. The supporting section 416 includes a supporting stand 418. A casing 422 of a ball bearing 420 is disposed on the supporting stand 418. A hole, which passes through along the axial direction of the ball screw 412, is formed in the casing 422. This other axial direction end side of the ball screw 412 passes through the hole. At the interior of the casing 422, a plurality of small spheres are aligned along the peripheral direction of the ball screw 412 so as to abut the ball screw 412 at the inner side of the casing 422.

The lower ends of plural supporting shafts 424 are fixed to the supporting stand 418. The supporting shafts 424 pass through a plurality of through-holes 426 formed in the casing 422. The inner diameter dimension of the through hole 426 changes at a specific position of the axial direction intermediate portion thereof. The inner diameter dimension is greater at the side above this specific position than at the side below (the supporting stand 418 side of) this specific position.

A compression coil spring 428 serving as an urging device is accommodated at the inner side of the portion of the through hole 426 which is above the aforementioned specific position. One end of the compression coil spring 428 abuts the portion of the through hole 426 which is the border between the large diameter portion and the small diameter portion thereof. The other end of the compression coil spring 428 abuts a flange portion 430 formed at the upper end portion of the supporting shaft 424. Accordingly, the compression coil spring 428 urges the ball bearing 420 toward the supporting stand 418 side via the portion of the through hole 426 that is the border between the large diameter portion and the small diameter portion thereof.

Figure 11:
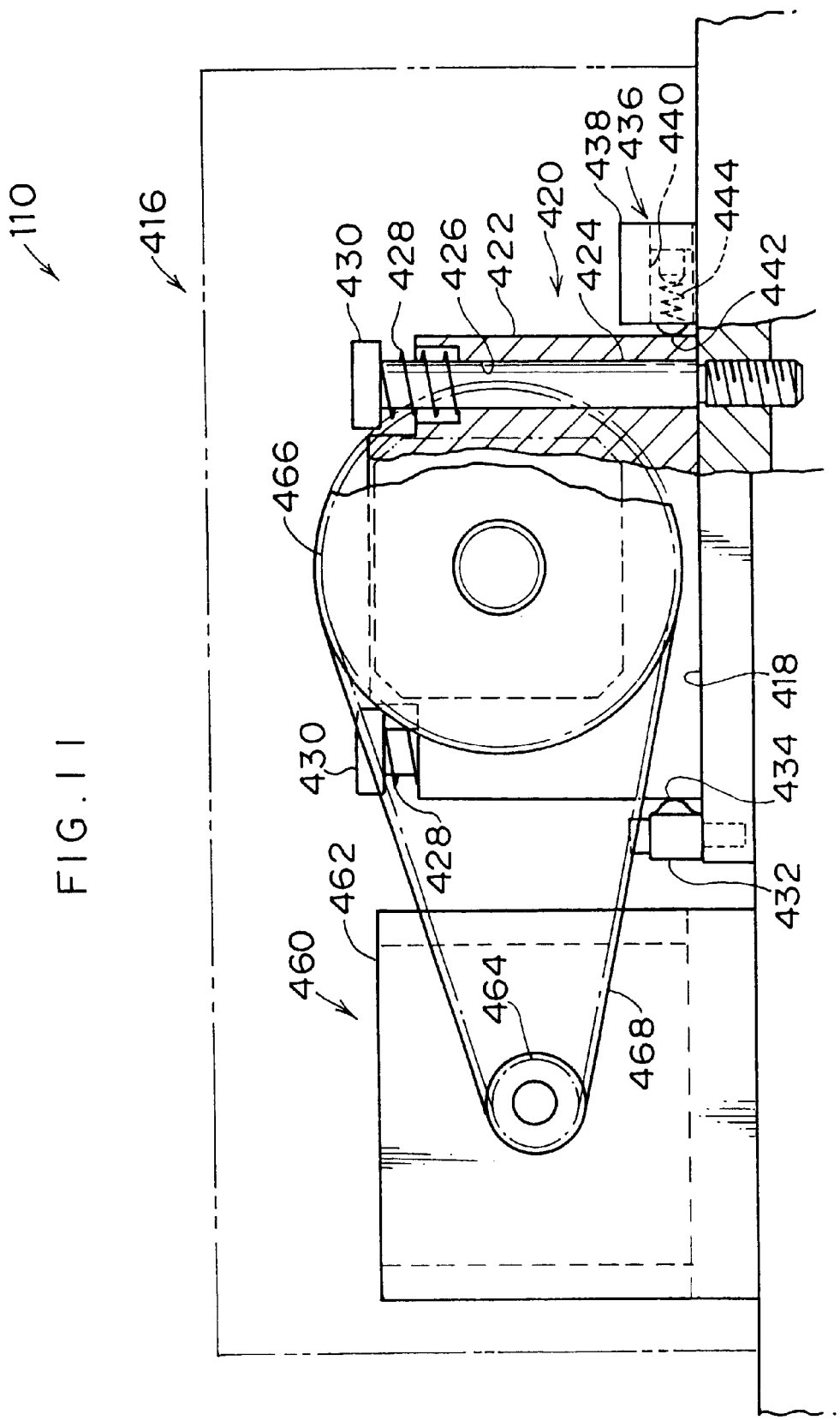
FIG. 11 is a front view in which a vicinity of the other axial direction end portion of the ball screw is illustrated in an enlarged manner.
Figure 12:
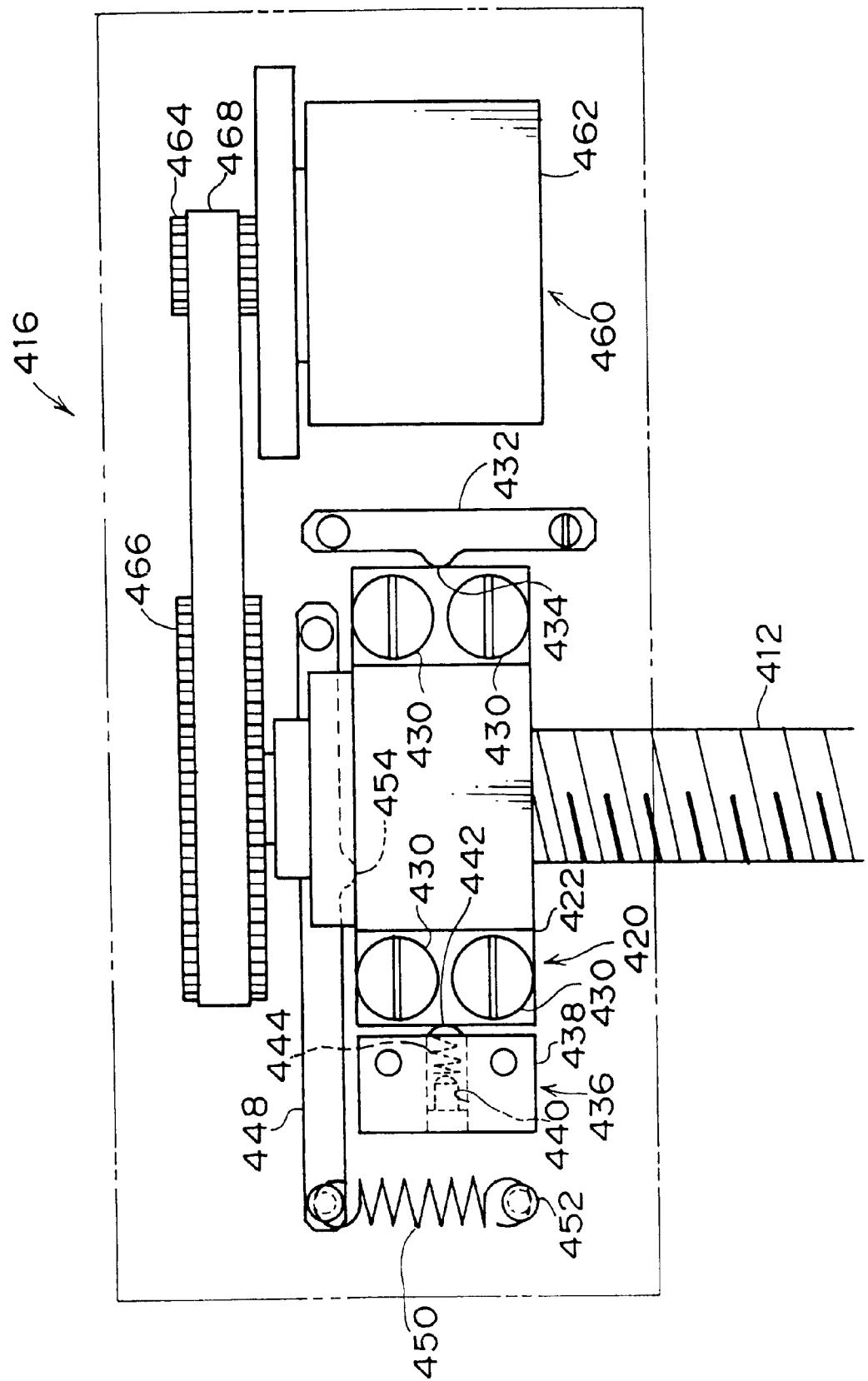
FIG. 12 is a plan view in which a vicinity of the other axial direction end portion of the ball screw is illustrated in an enlarged manner.
Figure 13:
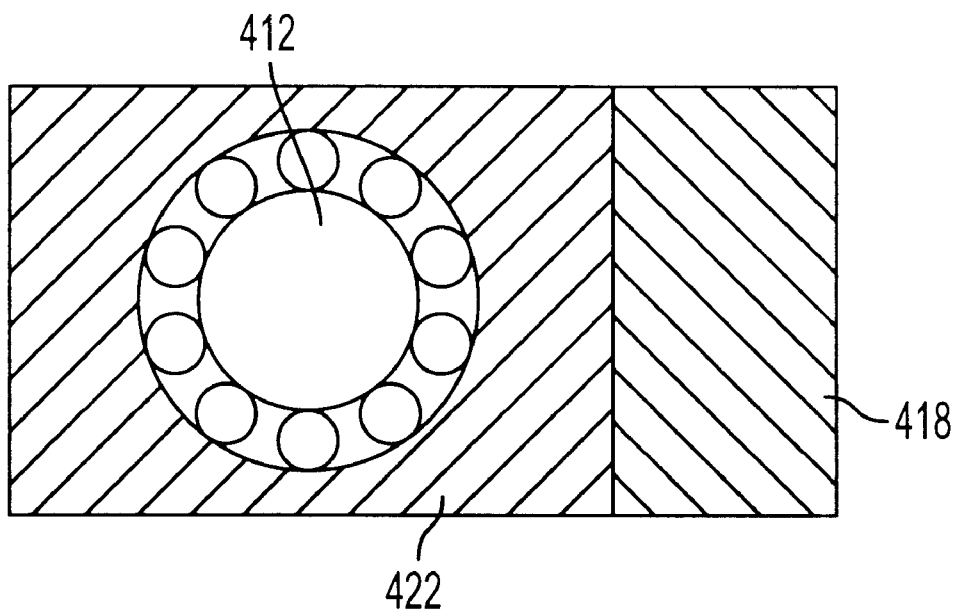
FIG. 13 is a cross-sectional line along the line 13—13 of the bearing in FIG. 10 showing an embodiment in which the bearing is a ball bearing with a plurality of balls.

As illustrated in FIG. 11, a limiting portion 432 is provided upright at the side of the casing 422 on the supporting stand 418 (specifically, at a side in the direction orthogonal to the axial directions of the ball screw 412 and the supporting shaft 424). A limiting projection 434 is formed to project from the limiting portion 432 toward the casing 422, and abuts a side end portion of the casing 422.

A presser portion 436 is provided at the side of the casing 422 opposite the side at which the limiting portion 432 is provided. The presser portion 436 has a box-shaped casing 438. An accommodating hole 440, which is a bottom which opens toward the casing 422, is formed in the casing 438. A presser pin 442 and a compression coil spring 444 serving as an urging device are accommodated within the accommodating hole 440. The presser pin 442 is substantially cylindrical, with the axial direction thereof being along the axial direction of the accommodating hole 440, and the distal end portion of the presser pin 442 at the side opposite the casing 422 is formed in a substantially semi-cylindrical shape. The compression coil spring 444 is disposed between the bottom portion of the accommodating hole 440 and the presser pin 442, and urges the presser pin 442 toward the casing 422 such that the distal end portion of the presser pin 442 press-contacts the casing 422.

A limiting wall 446 is formed at the supporting stand 418. The limiting wall 446 has a limiting surface which is directed more toward the axial direction other end side of the ball screw 412 than the casing 422. The casing 422 abuts the limiting wall 446 from the axial direction other end side of the ball screw 412.

An arm 448 is disposed at the side of the casing 422 opposite the side at which the limiting wall 446 is disposed. The longitudinal direction of the arm 448 is along a direction orthogonal to the axial direction of the ball screw 412 and the axial direction of the supporting shaft 424. One longitudinal direction end portion of the arm 448 is shaft-supported at the supporting stand 418 such that the axial direction of the arm 448 is parallel to the axial direction of the supporting shaft 424, and such that the arm 448 is freely pivotable around the axis thereof. One end portion of a tension coil spring 450 is anchored to the other longitudinal direction end portion of the arm 448. The other end portion of the tension coil spring 450 is anchored to an anchor portion 452 formed on the supporting stand 418. A longitudinal direction intermediate portion of the arm 448 is urged in a direction of approaching the casing 422. A projection 454 is formed at the longitudinal direction intermediate portion of the arm 448 so as to project toward the casing 422. The projection 454 abuts an end portion of the casing 422 at the other axial direction end side of the ball screw 412.

Namely, movement of the casing 422 on the supporting stand 418 is basically limited by the limiting portion 432, the presser pin 442 of the presser portion 436, the limiting wall 446, and the arm 448. Movement of the casing 422 in the direction of separating from the supporting stand 418 is basically limited by the urging force of the compression coil spring 428. In this way, the ball bearing 420 is positioned at a predetermined position on the supporting stand 418, and the axial direction other end portion of the ball screw 412 is shaft-supported at that position.

An actuator 460 is provided at the other axial direction end side of the ball bearing 420. The actuator 460 is provided with a motor 462. The axial direction of the output shaft of the motor 462 is parallel to the ball screw 412, and an external-toothed gear 464 is provided at the distal end portion of the output shaft. On the other hand, a gear 466 is formed coaxially in a vicinity of the other longitudinal direction end portion of the ball screw 412. The gear 464 and the gear 466 are connected by a toothed belt 468, and the driving force of the motor 462 is thereby transmitted to the ball screw 412.

As illustrated in FIG. 1, a pair of guide rods 470 are disposed parallel to the ball screw 412 at sides of the ball screw 412.

A slider 472 is fixed integrally to the lower side of the surface plate 402. The slider 472 is formed on the whole as a block-shaped member. A screw hole 474, which passes through along the axial direction of the ball screw 412, is formed in the slider 472. The slider 472 is screwed together with the ball screw 412 in a state in which the ball screw 412 passes through the screw hole 474. Through holes 476 are formed at both sides of the screw hole 474. The inner diameter dimension of the through hole 476 is slightly larger than the outer diameter dimension of the guide rod 470, and the guide rods 470 pass through the through holes 476. Due to the guide rods 470 passing through the through holes 476, the displacement of the slider 472 in directions other than the longitudinal direction of the guide rods 470 is limited by the guide rods 470.

Exposure Section 112

As illustrated in FIG. 1, at the exposure section 112, a scanning unit 164 is provided above the conveying path of the surface plate 402. A laser beam, whose lighting is controlled in accordance with image signals, is main-scanned (in the direction orthogonal to the conveying direction of the surface plate 402). On the other hand, the outward conveying of the surface plate 402 (toward the exposure section 112) is subscanning movement, and as a result thereof, at the exposure section 112, an image is recorded on the photopolymer plate 102 on the surface plate 402 at the time of the outward conveying. Due to the return conveying (away from the exposure section 112) of the surface plate 402, the surface plate 402 is returned to its original position. The sucking and holding of the photopolymer plate 102 on the surface plate 402 which has returned to its original position is cancelled.

Discharge Mechanism Section 166

The discharge mechanism section 166 is provided at the conveying direction rear end portion side (the side near the moving body 152) of the photopolymer plate 102 conveyed by the photopolymer plate conveying section 130. The discharge mechanism section 166 is provided so as to correspond to the surface plate 402 which has returned to its original position after an image has been recorded on the photopolymer plate 102.

As illustrated in FIG. 9, at the discharge mechanism section 166, each of the pair of temporarily supporting arms 154 is rotatably supported via a supporting shaft 170 at a stage base 168 such that the distal end portion of the temporarily supporting arm 154 is positioned in a vicinity of the surface plate 402. A convex portion 172, a concave portion 174, and a convex portion 176, each of which has a different heightwise (depthwise) dimension, are formed at the lower surface side of the temporarily supporting arm 154.

The moving stage 178 is disposed beneath the temporarily supporting arms 154. The moving stage 178 is movable along the temporarily supporting arms 154, and a roller 180 is provided at the distal end portion thereof. The roller 180 abuts the lower surfaces of the temporarily supporting arms 154. Accordingly, by moving the moving stage 178, the abutting supporting position of the roller 180 (the convex portion 172, the concave portion 174, and the convex portion 176) changes, and the heightwise positions of the distal end portions of the temporarily supporting arms 154 are thereby changed. A spring 182 is attached to the rear end portion of the temporarily supporting arm 154. The temporarily supporting arm 154 always follows the movement of the moving stage 178.

Figure 9A:
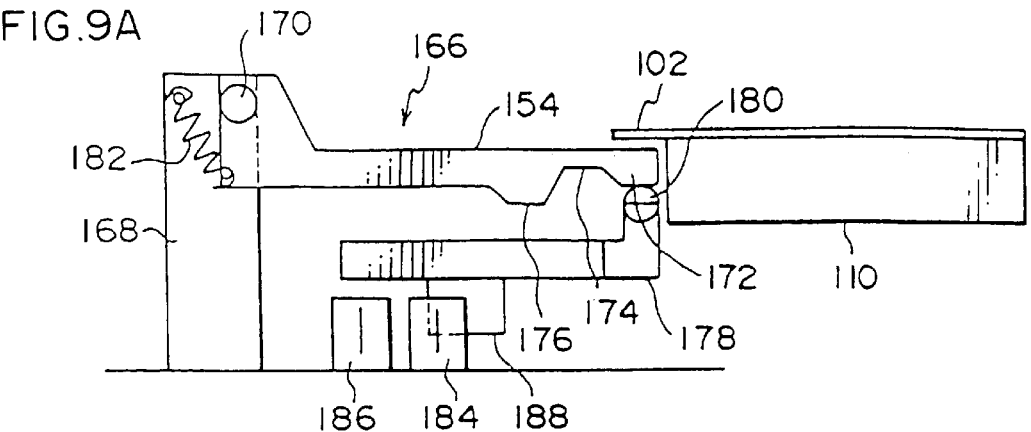
Figure 9B:
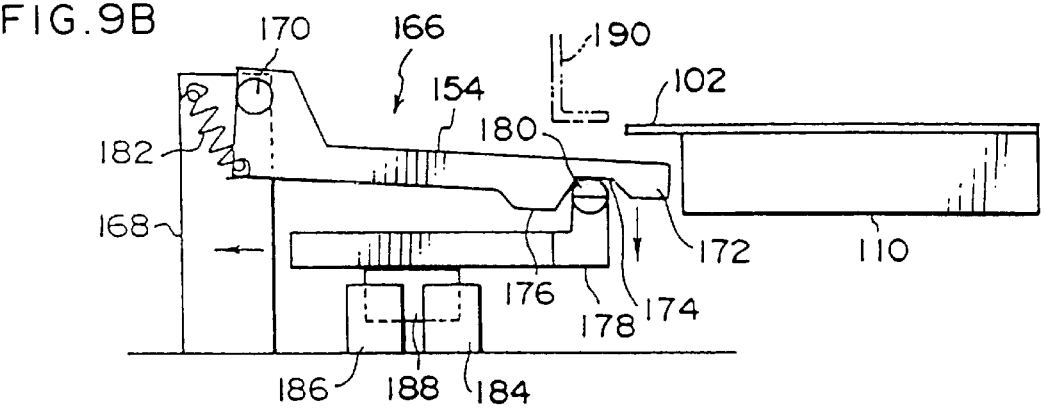
Figure 9C:
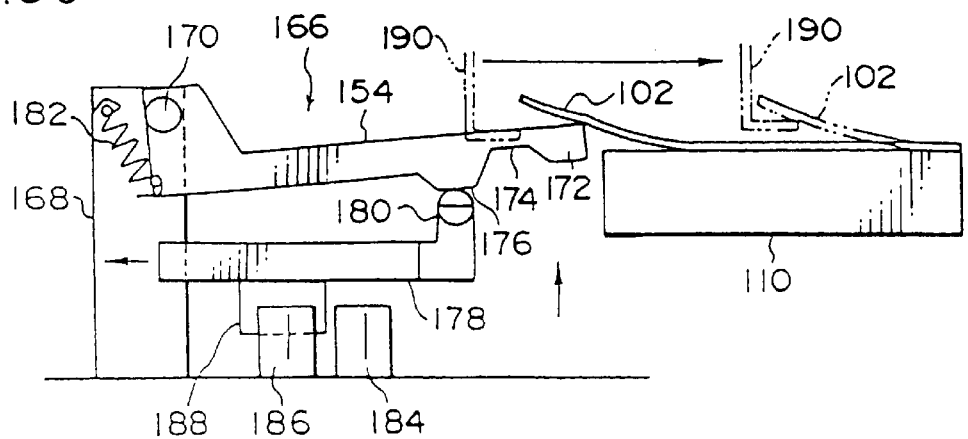

The dimensions of the respective portions are set such that the following states arise. In the state in which the roller 180 abuts and is supported at the convex portion 172, as illustrated in FIG. 9A, the temporarily supporting arm 154 is in a horizontal position at the same height as the surface plate 402. When the roller 180 is in a state of abutting and being supported at the concave portion 174, as shown in FIG. 9B, the temporarily supporting arm 154 is at a withdrawn position which is lower than the surface plate 402. In the state in which the roller 180 abuts and is supported at the convex portion 176, as illustrated in FIG. 9C, the temporarily supporting arm 154 is at a pushed up position which is higher than the surface plate 402. Accordingly, due to the roller 180 of the moving stage 178 abutting the convex portion 172 of the temporarily supporting arm 154 and the temporarily supporting arm 154 being set at a horizontal position at the same height as the surface plate 402, sagging of the photopolymer plate 102 on the surface plate 402 can be prevented. Further, due to the roller 180 of the moving stage 178 abutting the convex portion 176 of the temporarily supporting arm 154 and the temporarily supporting arm 154 being set at a pushed up position which is higher than the surface plate 402, the rear end portion of the photopolymer plate 102 on the surface plate 402 can be raised up.

A pair of sensors 184, 186 are disposed beneath the moving stage 178. Due to the sensors 184, 186 detecting a dog 188 provided at the moving stage 178, the position of the moving stage 178, i.e., the position of the temporarily supporting arm 154 can be detected. Namely, in the state in which only the sensor 184 detects the dog 188, the temporarily supporting arm 154 is set at the horizontal position at the same height as the surface plate 402. In the state in which both of the sensors 184, 186 detect the dog 188, the temporarily supporting arm 154 is set at the withdrawn position lower then the surface plate 402. In the state in which only the sensor 186 detects the dog 188, the temporarily supporting arm 154 is set at the pushed-up position higher than the surface plate 402.

On the other hand, a pair of plate-discharging claws 190 are provided above the temporarily supporting arms 154 at the discharge mechanism section 166. The pair of plate-discharging claws 190 are movable along guide rails 192 which are disposed along the surface plate 402. Namely, the plate-discharging claws 190 pass above the surface plate 402 and move to the conveying direction leading end portion of the photopolymer plate 102.

In the state in which the trailing end portion of the photopolymer plate 102 jutting out from the surface plate 402 is raised up by the temporarily supporting arms 154, due to the plate-discharging claws 190 moving in the conveying direction of the photopolymer plate 102, the plate-discharging claws 190 catch on the photopolymer plate 102. Accordingly, the photopolymer plate 102 on which the plate-discharging claws 190 are caught is conveyed to the downstream side of the surface plate 402 in accordance with the movement of the plate-discharging claws 190.

As described previously, as illustrated in FIG. 1, when the automatic developing device 116 is connected via the buffer section 114 to the downstream side of the surface plate 402 and plate feeding, exposure and development are all carried out automatically, the photopolymer plate 102 is smoothly fed out while the difference between the discharging speed of the discharge mechanism section 166 and the conveying speed of the automatic developing device 116 is absorbed at the buffer section 114.

Operation and Effects of the Present Embodiment

Hereinafter, the operation and effects of the present embodiment will be described.

First, the overall operation of the automatic exposure device 100 will be briefly described.

The photopolymer plate 102 and the interleaf sheet 118 accommodated in the magazine 208 are alternately removed by the suction conveying device 109 (the suction unit 300) and are fed out to the common conveying section 128. The photopolymer plate 102 which is fed out to the common conveying section 128 is conveyed by the photopolymer plate conveying section 130 and loaded on and positioned on the surface plate 402 of the exposure conveying section 110. As will be described in detail later, after positioning of the photopolymer plate 102 has been completed, the surface plate 402 is slid from a first position at which the surface plate 402 receives the photopolymer plate 102 (the position illustrated by the solid lines in FIG. 1) to a second position at which the photopolymer plate 102 is accommodated at the exposure section 112 (the position illustrated by the phantom lines in FIG. 1). In this way, the photopolymer plate 102 is accommodated in the exposure section 112, and an image is exposed thereon in the exposure section 112. After exposure of the photopolymer plate 102 at the exposure section 112 has been completed, the surface plate 402 is slid from the second position to the first position, and when the surface plate 402 returns to the first position, the photopolymer plate 102 is discharged from the discharge mechanism section 166. On the other hand, the interleaf sheet 118 is conveyed by the common conveying section 128 and the interleaf sheet conveying section 134, and is stacked in the interleaf sheet accommodating section 132 by the sheet material forcibly stacking device 141 provided at the stand 200.

Next, the operation and effects of the exposure conveying section 110, to which the ball screw feed mechanism of the present invention is applied, will be described.

The photopolymer plate 102 conveyed and discharged by the photopolymer plate conveying section 130 is placed onto the surface plate 402 while being supported by the temporarily supporting arms 154 such that unnecessary sagging thereof is prevented. Further, when the photopolymer plate 102 is placed on the surface plate 402, the moving body 152 moves and the pusher plate 156 pushes the trailing end portion of the photopolymer plate 102 in the conveying direction. In this way, the photopolymer plate 102 is prevented from being conveyed at an angle with respect to the conveying direction, and the photopolymer plate 102 is sent out to a predetermined conveying direction reference position at which the conveying direction trailing end portion of the photopolymer plate 102 juts out slightly from the surface plate 402. The photopolymer plate 102 which has reached the reference position is sucked and held by the vacuum formed by the suction groove 110A provided at the surface plate 402, and punch holes are formed therein by the puncher 160 provided at the moving body 152.

In this way, when the photopolymer plate 102 has been positioned on the surface plate 402, the motor 462 of the actuator 460 is operated, and the ball screw 412 is rotated in the forward direction which is one direction around the axis thereof. Due to the ball screw 412 rotating one revolution, the slider 472, whose displacement in directions other than the axial directions of the guide rods 470 and the ball screw 412 is limited by the guide rods 470, is moved toward the exposure section 112 along the axial direction of the ball screw 412 by one pitch of the ball screw 412. As described above, because the slider 472 is integrally connected with the surface plate 402, due to the slider 472 moving, the surface plate 402 moves. The photopolymer plate 102 placed on the surface plate 402 thereby moves toward the exposure section 112, and at the exposure section 112, an image is formed on the photopolymer plate 102.

On the other hand, the ball screw 412 is rotated in the forward direction by a preset number of rotations due to the driving force of the motor 462, such that the surface plate 402 is moved to a final position at the exposure section 112 side. Thereafter, the motor 462 is driven in the reverse direction such that the ball screw 412 rotates in the reverse direction. In this way, the slider 472 moves along the axial direction of the ball screw 412, and the surface plate 402 returns to the first position.

By operating the motor 462, the motor 462 itself vibrates. When the vibration is transmitted to the ball screw 412 via the gear 464, the toothed belt 468, and the gear 466, the ball screw 412 vibrates together with the ball bearing 420 in the axial direction and in the direction orthogonal to the axial direction. When the ball screw 412 attempts to move in a direction of separating from the limiting portion 432 due to this vibration, the casing 422 of the ball bearing 420 moves the pusher pin 442 of the pusher section 436 toward the bottom portion side of the accommodating hole 440 of the casing 438 against the urging force of the compression coil spring 444. Further, when the ball screw 412 attempts to move in the direction of separating from the supporting stand 418 due to this vibration, the casing 422 separates (is displaced away) from the supporting stand 418 against the urging force of the compression coil spring 428. Moreover, when the ball spring 412 attempts to move toward its own axial direction other end side due to this vibration, the casing 422 rotates (displaces) the arm 448 against the urging force of the tensile coil spring 450.

However, as described above, the casing 422 is urged toward the limiting portion 432 side by the compression coil spring 444 via the presser pin 442, and is urged toward the supporting stand 418 side against the urging force of the compression coil spring 428, and is urged toward the axial direction one end side thereof by the tensile coil spring 450 via the arm 448. Accordingly, as described above, even if the casing 422 is displaced as described above, it is forcibly returned to its original position by the aforementioned urging forces. In this way, the frequency of the vibration can be forcibly changed, and the resonance point is shifted. As a result, in the present embodiment, even if the ball screw 412 receives vibration from the motor 462, the ball screw 412 does not resonate and greatly vibrate, and as a result, the surface plate 402 does not greatly vibrate. Accordingly, image irregularities at the photopolymer plate 102, which are caused by the vibration of the surface plate 402, can be reduced or eliminated.

In the present embodiment, the compression coil springs 428 and 444 and the tensile coil spring 450 are used as the urging device. However, the urging device is not limited to a spring, and any member which is elastic, such as a rubber member or the like, can be used.

What is claimed is:

1. A ball screw feed mechanism comprising:
   a ball screw which is rod-shaped, and at whose outer peripheral portion a male screw is formed, and which rotates due to driving force of a driving device;
   a slider which is screwed together with the ball screw, and which slides along an axial direction of the ball screw due to rotation of the ball screw around the axis of the ball screw;
   a supporting portion which supports the ball screw at an axial direction end portion of the ball screw such that the ball screw is displaceable along the axial direction of the ball screw; and
   an urging device which resiliently urges the ball screw in a direction opposite to a displacement direction, with respect to displacement of the ball screw along the axial direction of the ball screw, by resiliently urging the supporting portion.

2. A ball screw feed mechanism according to claim 1, wherein the supporting portion includes:
   a supporting stand which is substantially parallel to the axial direction of the ball screw;
   an abutting portion which the ball screw rotatably abuts; and
   a shaft, one end of the shaft being fixed to the supporting stand such that the abutting portion is supported at the supporting stand.

3. A ball screw feed mechanism according to claim 2, wherein a flange is formed at another end of the shaft, and an urging portion which urges the abutting portion toward the supporting stand is mounted to the flange.

4. A ball screw feed mechanism comprising:
   (a) a driving device;
   (b) a threaded rod having opposite ends and a longitudinal axis, with one end of the rod connected to the driving device, the driving device when operated, rotating the rod about the rod's longitudinal axis;
   (c) a slider disposed on the rod, the slider supporting internal threads threadably engaged with the rod, which causes the slider to move along the rod when the rod rotates about its longitudinal axis;
   (d) a casing accommodating a bearing through which the rod extends;
   (e) an urging device which resiliently urges the threaded rod in directions opposite to displacement directions, with respect to displacement of the rod in at least three different directions, by resiliently urging the casing; and
   (f) a stand supporting the driving device, the casing, and a portion of the urging device.

5. A ball screw feed mechanism according to claim 4, wherein the bearing includes a plurality of balls.

6. A method for reducing vibration in a ball screw feed mechanism, wherein the ball screw feed mechanism includes a slider threadably disposed on a rod, with the slider moving along the rod when the rod rotates, the method comprising:
   (a) extending one end of the rod through a bearing;
   (b) applying resilient urging forces along three different directions to the bearing, with each direction being substantially orthogonal to each of the other directions, for resisting displacements of the rod; and
   (c) rotatably driving the rod using a motor to apply rotational mechanical energy to the end of the rod extending through the bearing.

7. The method of claim 6, wherein applying urging forces includes providing at least one urging force, which increases approximately in proportion to an amount of displacement towards the urging force.

8. The method of claim 6, further comprising abutting the bearing against at least one surface due to an urging force pressing the bearing towards the surface.

9. The method of claim 6, wherein applying an urging force includes providing a support for the bearing permitting limited displacement of the bearing in directions substantially orthogonal to each other and to the longitudinal axis of the rod, with resilient members opposing displacement.

10. A ball screw feed mechanism comprising:
    a ball screw which is rod-shaped, and at whose outer peripheral portion a male screw is formed, and which rotates due to driving force of a driving device;
    a slider which is screwed together with the ball screw, and which slides along an axial direction of the ball screw due to rotation of the ball screw around the axis of the ball screw;
    a supporting portion which supports the ball screw at an axial direction end portion of the ball screw such that the ball screw is displaceable along the axial direction of the ball screw; and
    an urging device which urges the ball screw in a direction opposite to a displacement direction, with respect to displacement of the ball screw along the axial direction of the ball screw,
    wherein the urging device includes:
      an arm which is disposed substantially orthogonal to the axial direction of the ball screw, one end of the arm being pivotably mounted; and an urging portion anchored on the pivotable one end of the arm, substantially parallel to the axial direction of the ball screw.

11. A ball screw feed mechanism according to claim 10, wherein the abutting portion includes:
   a bearing portion abutting the outer peripheral portion of the ball screw; and
   a casing disposed on the supporting stand.

12. A ball screw feed mechanism comprising:
   a ball screw which is rod-shaped, and at whose outer peripheral portion a male screw is formed, and which rotates due to driving force of a driving device;
   a slider which is screwed together with the ball screw, and which slides along an axial direction of the ball screw due to rotation of the ball screw around the axis of the ball screw;
   a supporting portion which supports the ball screw at an axial direction end portion of the ball screw such that the ball screw is displaceable along the axial direction of the ball screw; and
   an urging device which urges the ball screw in a direction opposite to a displacement direction, with respect to displacement of the ball screw along the axial direction of the ball screw;
   wherein the supporting portion includes:
      a supporting stand which is substantially parallel to the axial direction of the ball screw;
      an abutting portion which the ball screw rotatably abuts; and
      a shaft, one end of the shaft being fixed to the supporting stand such that the abutting portion is supported at the supporting stand; and
   wherein the urging device includes:
      an arm which is disposed substantially orthogonal to the axial direction of the ball screw, one end of the arm being pivotably mounted; and
      an urging portion anchored on the pivotable one end of the arm, substantially parallel to the axial direction of the ball screw.

13. A ball screw feed mechanism according to claim 12, wherein the abutting portion includes:
   a bearing portion abutting the outer peripheral portion of the ball screw; and
   a casing disposed on the supporting stand.

14. A ball screw feed mechanism comprising:
   a ball screw which is rod-shaped, and at whose outer peripheral portion a male screw is formed, and which rotates due to driving force of a driving device;
   a slider which is screwed together with the ball screw, and which slides along an axial direction of the ball screw due to rotation of the ball screw around the axis of the ball screw;
   a supporting portion which supports the ball screw at an axial direction end portion of the ball screw such that the ball screw is displaceable along a direction orthogonal to the axial direction of the ball screw; and
   an urging device which urges the ball screw in a direction opposite to a displacement direction, with respect to displacement of the ball screw along the direction orthogonal to the axial direction of the ball screw,
   wherein the abutting portion includes:
      a bearing portion abutting the outer peripheral portion of the ball screw; and
      a casing disposed on the supporting stand, and
   wherein the urging device includes:
      a presser portion fixed on the supporting stand;
      an urging portion one end of which is mounted to an interior of the presser portion and the other end of which urges the casing; and
      a limiting portion fixed on the supporting stand such that the casing is sandwiched between and abutted by the limiting portion and the presser portion.

15. A ball screw feed mechanism according to claim 14, wherein the urging device includes:
   a flange formed at another end of the shaft; and
   an urging portion mounted to the flange and urging the abutting portion toward the supporting stand.

16. A ball screw feed mechanism comprising:
   (a) a driving device;
   (b) a threaded rod having opposite ends and a longitudinal axis, with one end of the rod connected to the driving device, the driving device when operated, rotating the rod about the rod's longitudinal axis;
   (c) a slider disposed on the rod, the slider supporting internal threads threadably engaged with the rod, which causes the slider to move along the rod when the rod rotates about its longitudinal axis;
   (d) a casing accommodating a bearing through which the rod extends;
   (e) an urging device which urges the threaded rod in directions opposite to displacement directions, with respect to displacement of the rod in at least three different directions; and
   (f) a stand supporting the driving device, the casing, and a portion of the urging device,
   wherein the urging device includes:
      a presser portion fixed on the stand, the presser portion having an interior;
      an urging portion having opposite ends, one end being mounted to the interior of the presser portion, and the other end applying an urging force to the casing; and
      a limiting portion fixed on the stand, with the casing sandwiched between the limiting portion and the presser portion, and abutted by both the limiting portion and the presser portion.

17. A ball screw feed mechanism comprising:
   (a) a driving device;
   (b) a threaded rod having opposite ends and a longitudinal axis, with one end of the rod connected to the driving device, the driving device when operated, rotating the rod about the rod's longitudinal axis;
   (c) a slider disposed on the rod, the slider supporting internal threads threadably engaged with the rod, which causes the slider to move along the rod when the rod rotates about its longitudinal axis;
   (d) a casing accommodating a bearing through which the rod extends;
   (e) an urging device which urges the threaded rod in directions opposite to displacement directions, with respect to displacement of the rod in at least three different directions; and
   (f) a stand supporting the driving device, the casing, and a portion of the urging device,
   wherein the urging device includes:
      an arm having opposite ends, the arm extending substantially orthogonal to the longitudinal axis of the rod, with one end of the arm being pivotable about the arm's other end; and
      a resiliently deformable member anchored to the one end of the arm that is pivotable, and urging the one end of the arm in a direction substantially parallel to the longitudinal axis of the rod.

18. A ball screw feed mechanism comprising:
   (a) a driving device;
   (b) a threaded rod having opposite ends and a longitudinal axis, with one end of the rod connected to the driving device, the driving device when operated, rotating the rod about the rod's longitudinal axis;

(c) a slider disposed on the rod, the slider supporting internal threads threadably engaged with the rod, which causes the slider to move along the rod when the rod rotates about its longitudinal axis;

(d) a casing accommodating a bearing through which the rod extends;.

(e) an urging device which urges the threaded rod in directions opposite to displacement directions, with respect to displacement of the rod in at least three different directions; and (f) a stand supporting the driving device, the casing, and a portion of the urging device, wherein the casing is connected to the supporting stand via a shaft having opposite ends, with one end of the shaft fixed to the supporting stand.

19. A ball screw feed mechanism according to claim 18, wherein the other end of the shaft includes a flange, and a resiliently deformable member is resiliently deformed and disposed between the flange and the casing, urging the casing towards the stand.

* * * * *